United States Patent
Ofoli et al.

(10) Patent No.: US 9,475,006 B2
(45) Date of Patent: Oct. 25, 2016

(54) SCR CATALYST AMMONIA SURFACE COVERAGE ESTIMATION AND CONTROL

(71) Applicant: CUMMINS FILTRATION IP, INC., Minneapolis, MN (US)

(72) Inventors: Abdul R. Ofoli, Columbus, IN (US); Hasan Mohammed, Charleston, SC (US)

(73) Assignee: CUMMINS FILTRATION IP, INC., Minneapolis, MN (US)

( * ) Notice: Subject to any disclaimer, the term of this patent is extended or adjusted under 35 U.S.C. 154(b) by 0 days.

(21) Appl. No.: 14/287,759

(22) Filed: May 27, 2014

(65) Prior Publication Data

US 2014/0314645 A1    Oct. 23, 2014

Related U.S. Application Data

(63) Continuation of application No. 12/767,664, filed on Apr. 26, 2010, now Pat. No. 8,733,083.

(51) Int. Cl.
  *F01N 3/00* (2006.01)
  *B01D 53/94* (2006.01)
  (Continued)

(52) U.S. Cl.
  CPC .......... *B01D 53/9495* (2013.01); *B01D 53/90* (2013.01); *B01D 53/9477* (2013.01); *F01N 3/208* (2013.01); *B01D 53/9431* (2013.01); *B01D 2251/208* (2013.01);
  (Continued)

(58) Field of Classification Search
  CPC .......................... F01N 2560/021; F01N 3/208
  USPC ........... 60/286, 297, 273, 276, 299; 423/212
  See application file for complete search history.

(56) References Cited

U.S. PATENT DOCUMENTS

| | | | |
|---|---|---|---|
| 4,314,345 | A | 2/1982 | Shiraishi et al. |
| 5,552,128 | A | 9/1996 | Chang et al. |

(Continued)

FOREIGN PATENT DOCUMENTS

| | | |
|---|---|---|
| CN | 1804378 | 7/2006 |
| CN | 1809685 | 7/2007 |

(Continued)

OTHER PUBLICATIONS

U.S. Appl. No. 12/112,500 Notice of Allowance received Sep. 29, 2011.

(Continued)

*Primary Examiner* — Kenneth Bomberg
*Assistant Examiner* — Anthony Ayala Delgado
(74) *Attorney, Agent, or Firm* — Foley & Lardner LLP

(57) ABSTRACT

Described herein are various embodiments of an apparatus, a system, and a methods for reducing $NO_x$ emissions using ammonia storage on an SCR catalyst. For example, according to one embodiment, an apparatus for controlling an SCR system of an internal combustion engine system includes an ammonia storage module and a reductant dosing module. The ammonia storage module determines an ammonia storage surface coverage on an SCR catalyst of the SCR system and an ammonia compensation value based on one of an excess ammonia flow rate entering the SCR catalyst and an excess $NO_x$ flow rate entering the SCR catalyst. The reductant dosing module that generates a reductant dosing command based on the ammonia compensation value.

22 Claims, 7 Drawing Sheets

(51) Int. Cl.
*B01D 53/90* (2006.01)
*F01N 3/20* (2006.01)
*F01N 3/035* (2006.01)

(52) U.S. Cl.
CPC ........ *B01D 2251/2062* (2013.01); *B01D 2251/2067* (2013.01); *B01D 2255/20723* (2013.01); *B01D 2255/20738* (2013.01); *B01D 2255/20761* (2013.01); *B01D 2255/50* (2013.01); *B01D 2255/911* (2013.01); *B01D 2258/012* (2013.01); *F01N 3/035* (2013.01); *F01N 2560/026* (2013.01); *F01N 2570/18* (2013.01); *F01N 2900/0411* (2013.01); *F01N 2900/0412* (2013.01); *F01N 2900/0418* (2013.01); *F01N 2900/1402* (2013.01); *F01N 2900/1411* (2013.01); *F01N 2900/1602* (2013.01); *F01N 2900/1616* (2013.01); *F01N 2900/1622* (2013.01); *Y02T 10/24* (2013.01)

(56) References Cited

U.S. PATENT DOCUMENTS

| | | | |
|---|---|---|---|
| 5,809,775 A | 9/1998 | Tarabulski et al. | |
| 6,109,024 A | 8/2000 | Kinugasa et al. | |
| 6,125,629 A | 10/2000 | Patchett | |
| 6,182,443 B1 | 2/2001 | Jarvis et al. | |
| 6,266,955 B1 | 7/2001 | Liang et al. | |
| 6,269,633 B1 | 8/2001 | Van Nieuwstadt et al. | |
| 6,295,809 B1 | 10/2001 | Hammerle et al. | |
| 6,311,484 B1 | 11/2001 | Roth et al. | |
| 6,375,828 B2 | 4/2002 | Ando et al. | |
| 6,415,602 B1 | 7/2002 | Patchett et al. | |
| 6,427,439 B1 | 8/2002 | Xu et al. | |
| 6,446,430 B1 | 9/2002 | Roth et al. | |
| 6,546,720 B2 | 4/2003 | Van Nieuwstadt | |
| 6,581,374 B2 | 6/2003 | Patchett et al. | |
| 6,662,553 B2 | 12/2003 | Patchett et al. | |
| 6,701,707 B1 | 3/2004 | Upadhyay et al. | |
| 6,713,030 B1 | 3/2004 | Chandler et al. | |
| 6,742,326 B2 | 6/2004 | Xu et al. | |
| 6,742,330 B2 | 6/2004 | Genderen | |
| 6,829,885 B2 | 12/2004 | Surnilla et al. | |
| 6,882,929 B2 | 4/2005 | Liang et al. | |
| 6,892,530 B2 | 5/2005 | Montreuil et al. | |
| 6,901,745 B2 | 6/2005 | Schnaibel et al. | |
| 6,928,806 B2 | 8/2005 | Tennison et al. | |
| 6,981,368 B2 | 1/2006 | Van Nieuwstadt et al. | |
| 6,993,900 B2 | 2/2006 | Upadhyay et al. | |
| 7,017,389 B2 | 3/2006 | Gouma | |
| 7,063,642 B1 | 6/2006 | Hu et al. | |
| 7,093,427 B2 | 8/2006 | Van Nieuwstadt et al. | |
| 7,113,835 B2 | 9/2006 | Boyden et al. | |
| 7,117,046 B2 | 10/2006 | Boyden et al. | |
| 7,134,273 B2 | 11/2006 | Mazur et al. | |
| 7,150,145 B2 | 12/2006 | Patchett et al. | |
| 7,168,243 B2 | 1/2007 | Endicott et al. | |
| 7,178,328 B2 | 2/2007 | Solbrig | |
| 7,204,081 B2 | 4/2007 | Yasui et al. | |
| 7,213,395 B2 | 5/2007 | Hu et al. | |
| 7,263,825 B1 | 9/2007 | Wills et al. | |
| 7,293,410 B2 | 11/2007 | Miura | |
| 7,320,781 B2 | 1/2008 | Lambert et al. | |
| 7,332,135 B2 | 2/2008 | Gandhi et al. | |
| 7,485,272 B2 | 2/2009 | Driscoll et al. | |
| 7,603,846 B2 | 10/2009 | Lueders et al. | |
| 7,628,009 B2 | 12/2009 | Hu et al. | |
| 7,631,490 B2 | 12/2009 | Colignon | |
| 7,650,746 B2 | 1/2010 | Hu et al. | |
| 7,685,813 B2 | 3/2010 | McCarthy, Jr. | |
| 7,802,419 B2 | 9/2010 | Doring | |
| 7,832,200 B2 | 11/2010 | Kesse et al. | |
| 7,861,518 B2 | 1/2011 | Federle | |
| 7,892,508 B2 | 2/2011 | Katoh | |
| 7,950,222 B2 | 5/2011 | Hodzen | |
| 7,997,070 B2 | 8/2011 | Yasui et al. | |
| 8,020,374 B2 | 9/2011 | Walz et al. | |
| 8,061,126 B2 | 11/2011 | Gady et al. | |
| 8,074,445 B2 | 12/2011 | Ofoli et al. | |
| 2002/0044897 A1 | 4/2002 | Kakwani et al. | |
| 2003/0177766 A1 | 9/2003 | Wang et al. | |
| 2003/0182935 A1 | 10/2003 | Kawai et al. | |
| 2004/0098968 A1 | 5/2004 | Van Nieuwstadt et al. | |
| 2004/0112046 A1 | 6/2004 | Tumati et al. | |
| 2004/0128982 A1 | 7/2004 | Patchett et al. | |
| 2005/0260761 A1 | 11/2005 | Lanier et al. | |
| 2005/0282285 A1 | 12/2005 | Radhamohan et al. | |
| 2006/0086080 A1 | 4/2006 | Katogi et al. | |
| 2006/0130458 A1 | 6/2006 | Solbrig | |
| 2006/0144038 A1 | 7/2006 | Miura | |
| 2006/0155486 A1 | 7/2006 | Walsh et al. | |
| 2006/0212140 A1 | 9/2006 | Brackney | |
| 2007/0044456 A1 | 3/2007 | Upadhyay et al. | |
| 2007/0137181 A1 | 6/2007 | Upadhyay et al. | |
| 2007/0137184 A1 | 6/2007 | Patchett et al. | |
| 2007/0214777 A1 | 9/2007 | Allansson et al. | |
| 2007/0295003 A1 | 12/2007 | Dingle et al. | |
| 2008/0022658 A1 | 1/2008 | Viola et al. | |
| 2008/0022659 A1 | 1/2008 | Viola et al. | |
| 2008/0031793 A1 | 2/2008 | DiFrancesco et al. | |
| 2008/0060348 A1 | 3/2008 | Robel et al. | |
| 2008/0066455 A1 | 3/2008 | Viola | |
| 2008/0250774 A1 | 10/2008 | Solbrig | |
| 2008/0250778 A1 | 10/2008 | Solbrig | |
| 2008/0295499 A1 | 12/2008 | Driscoll et al. | |
| 2009/0049827 A1 | 2/2009 | Wei et al. | |
| 2009/0214397 A1 | 8/2009 | Shirono et al. | |
| 2009/0272099 A1 | 11/2009 | Garimella et al. | |
| 2009/0272101 A1 | 11/2009 | Wills et al. | |
| 2009/0272104 A1 | 11/2009 | Garimella et al. | |
| 2009/0272105 A1 | 11/2009 | Chi et al. | |
| 2009/0301066 A1 | 12/2009 | Sindano et al. | |
| 2010/0024390 A1 | 2/2010 | Wills et al. | |
| 2010/0024393 A1 | 2/2010 | Chi et al. | |
| 2010/0024397 A1 | 2/2010 | Chi et al. | |
| 2010/0028230 A1 | 2/2010 | Gady et al. | |
| 2010/0043404 A1 | 2/2010 | Hebbale et al. | |
| 2010/0050614 A1 | 3/2010 | Parmentier et al. | |
| 2010/0122526 A1 | 5/2010 | Vanderveen et al. | |
| 2010/0229531 A1 | 9/2010 | Chi et al. | |
| 2010/0242438 A1 | 9/2010 | Mital | |
| 2010/0242440 A1 | 9/2010 | Garimella et al. | |
| 2010/0275583 A1 | 11/2010 | Farrell et al. | |
| 2010/0326052 A1 | 12/2010 | Sun | |
| 2011/0058999 A1 | 3/2011 | Ettireddy et al. | |

FOREIGN PATENT DOCUMENTS

| | | |
|---|---|---|
| EP | 1 083 979 | 3/2001 |
| EP | 1 129 278 | 9/2001 |
| EP | 1 338 562 | 8/2003 |
| EP | 1 339 955 | 9/2003 |
| EP | 1 431 533 | 6/2004 |
| EP | 1 609 977 | 12/2005 |
| EP | 1 672 192 | 6/2006 |
| EP | 1 712 764 | 10/2006 |
| JP | 10-118492 | 5/1998 |
| JP | 10-288030 | 10/1998 |
| JP | 2002-327617 | 11/2002 |
| JP | 2004-100700 | 4/2004 |
| JP | 2007-255367 | 10/2007 |
| KP | 1020080030163 | 4/2008 |
| KR | 1020030034139 | 1/2003 |
| KR | 1020010043138 | 5/2005 |
| KR | 1020100061145 | 11/2008 |
| WO | WO-99/55446 | 11/1999 |
| WO | WO-02/14657 | 2/2002 |
| WO | WO-2004/000443 | 12/2003 |
| WO | WO-2006/000877 | 1/2006 |

(56) References Cited

FOREIGN PATENT DOCUMENTS

| WO | WO-2007/014649 | 2/2007 |
|---|---|---|
| WO | WO-2007/066502 | 6/2007 |
| WO | WO-2008/009940 | 1/2008 |

OTHER PUBLICATIONS

U.S. Appl. No. 12/112,500 Office Action received Apr. 15, 2011.
U.S. Appl. No. 12/112,622 Notice of Allowance received Aug. 5, 2011.
U.S. Appl. No. 12/112,622 Office Action received Mar. 3, 2011.
U.S. Appl. No. 12/112,678 Final Office Action received Jul. 22, 2011.
U.S. Appl. No. 12/112,678 Notice of Allowance received Feb. 2, 2012.
U.S. Appl. No. 12/112,678 Office Action received Feb. 7 , 2011.
U.S. Appl. No. 12/112,678 Office Action received Sep. 30, 2011.
U.S. Appl. No. 12/112,795 Notice of Allowance received Mar. 2, 2012.
U.S. Appl. No. 12/112,795 Office Action received Sep. 20, 2011.
U.S. Appl. No. 12/433,586 Notice of Allowance mailed Jul. 12, 2012.
U.S. Appl. No. 12/433,586 Office Action received Mar. 20, 2012.
U.S. Appl. No. 12/433,586 Office Action received Oct. 24, 2011.
U.S. Appl. No. 12/433,600 Notice of Allowance received Nov. 14, 2011.
U.S. Appl. No. 12/433,705 Notice of Allowance received Apr. 2, 2012.
U.S. Appl. No. 12/433,705 Office Action received Nov. 8, 2011.
U.S. Appl. No. 12/433,730 Final Office Action mailed Oct. 9, 2012.
U.S. Appl. No. 12/433,730 Notice of Allowance received Apr. 11, 2013.
U.S. Appl. No. 12/433,730 Office Action mailed May 10, 2012.
U.S. Appl. No. 12/433,730 Office Action received Oct. 7, 2011.
U.S. Appl. No. 12/433,767 Notice of Allowance mailed Aug. 3, 2012.
U.S. Appl. No. 12/433,767 Office Action received Apr. 6, 2012.
U.S. Appl. No. 12/433,767 Office Action received Oct. 26, 2011.
U.S. Appl. No. 12/632,628 Notice of Allowance received Oct. 1, 2012.
U.S. Appl. No. 12/632,628 Office Action received Apr. 30, 2012.
U.S. Appl. No. 12/632,646 Notice of Allowance mailed Jun. 4, 2012.
U.S. Appl. No. 12/879,776 Notice of Allowance received Mar. 25, 2013.
U.S. Appl. No. 12/879,776 Office Action mailed Dec. 14, 2012.
Chinese Patent Application No. 200980115540.1 Notice of Allowance mailed Feb. 1, 2013.
Chinese Patent Application No. 200980115540.1 Office Action mailed Jun. 26, 2012.
Ettireddy, et al., "Surface characterization studies of TiO2 supported manganese oxide catalysts for low temperature SCR of NO with NH3," Applied Catalysis B, 76 (2007).
PCT/US2009/042321 International Search Report and Written Opinion, Dec. 14, 2009.
PCT/US2009/042330 International Search Report and Written Opinion, Dec. 17, 2009.
PCT/US2009/042330, International Search Report and Written Opinion, Dec. 17, 2009.
PCT/US2009/042335 International Search Report and Written Opinion, Dec. 14, 2009.
PCT/US2009/042340 International Search Report and Written Opinion, Dec. 16, 2009.
PCT/US2009/042406 International Search Report and Written Opinion, Dec. 18, 2009.
PCT/US2009/042409, International Search Report and Written Opinion, Nov. 25, 2009.
PCT/US2009/042412 International Search Report and Written Opinion, Dec. 16, 2009.
PCT/US2009/042419 International Search Report and Written Opinion, Jan. 27, 2010.
PCT/US2009/042423, International Search Report and Written Opinion, Nov. 27, 2009.
PCT/US2009/067020, International Search Report and Written Opinion, Jul. 13, 2010.
PCT/US2009/067023, International Search Report and Written Opinion, Jul. 13, 2010.
PCT/US2010/048502, International Search Report and Written Opinion, May 23, 2011.
PCT/US2011/033767 International Search Report and Written Opinion, Feb. 8, 2012.
Pena, et al., "Identification of Surface Speices on Titania-Supported Manganese, Chromium, and Copper Oxide Low-Temperature Scr Catalysts," Journal of Physical Chemistry B, 1008 (2004), 9927-9936.
Schar, et al., Control of a Urea SCR Catalytic Converter System for a Mobile Heavy Duty Diesel Engine, SAE 2003-01-0776, Mar. 6, 2003.

SCR CATALYST AMMONIA SURFACE COVERAGE ESTIMATION AND CONTROL

CROSS REFERENCE TO RELATED APPLICATIONS

The present application is a Continuation of U.S. patent application Ser. No. 12/767,664, filed on Apr. 26, 2010, the contents of which are incorporated herein by reference in its entirety.

FIELD

This disclosure relates to exhaust gas after-treatment systems for internal combustion engines, and more particularly to an apparatus, system and method for estimating and controlling ammonia surface coverage on a selective catalytic reduction (SCR) catalyst.

BACKGROUND

Exhaust emissions regulations for internal combustion engines have become more stringent over recent years. The regulated emissions of NO and particulates from internal combustion engines are low enough that in many cases the emissions levels cannot be met with improved combustion technologies. Therefore, the use of aftertreatment systems on engines to reduce harmful exhaust emissions is increasing. For reducing $NO_x$ emissions, $NO_x$ reduction systems, including selective catalytic reduction (SCR) systems, are utilized to convert $NO_x$ (NO and $NO_2$ in some fraction) to $N_2$ and other compounds. SCR systems utilize a reductant (e.g., diesel exhaust fluid (DEF), typically ammonia, and an SCR catalyst to convert the $NO_x$. Currently available SCR systems can produce high $NO_x$ conversion rates allowing the combustion technologies to focus on power and efficiency. However, currently available SCR systems also suffer from several drawbacks.

Most SCR systems generate ammonia to reduce $NO_x$ present in the exhaust gas generated by the internal combustion engine. When just the proper amount of ammonia is available at the SCR catalyst under the proper conditions, the ammonia is utilized to reduce $NO_x$. Due to the undesirability of handling pure ammonia, many systems utilize an alternate compound such as urea, that vaporizes and decomposes to ammonia before entering the SCR catalyst. Many SCR systems that utilize urea dosing to generate ammonia depend upon the real-time delivery of urea to the SCR catalyst as engine $NO_x$ emissions emerge. Urea dosers have relatively slow physical dynamics compared to engine transients, such as mass flow, temperature, and emissions. Therefore, urea doser dynamics can substantially affect an SCR controls system, particularly during transient operating conditions. For example, based on the operating conditions, the urea dynamics may result in an excess of ammonia causing ammonia slip out of the SCR catalyst or a deficiency of ammonia causing excess amounts of $NO_x$ entering the atmosphere.

Some currently available SCR systems account for the dynamics of the urea dosing and the generally fast transient nature of internal combustion engines by utilizing the inherent ammonia storage capacity of many SCR catalyst formulations. Certain currently available systems determine whether the SCR catalyst is at an ammonia storing (adsorption) or ammonia ejecting (desorption) temperature. When the SCR catalyst is storing ammonia, the system injects urea until the catalyst is full. When the SCR catalyst is ejecting ammonia, the system halts injection and allows stored ammonia to release and reduce $NO_x$. Presently available systems tracking the SCR catalyst temperature in this manner suffer from a few drawbacks. For example, the amount of ammonia stored on the SCR catalyst varies with temperature. However, presently available systems assume a storage amount below a specified temperature, and zero storage above the specified temperature. Therefore, the controls may toggle significantly around the specified temperature, significantly overestimate ammonia storage capacity just below the specified temperature, and significantly underestimate ammonia storage capacity just above the specified temperature.

SUMMARY

The subject matter of the present application has been developed in response to the present state of the art, and in particular, in response to the problems and needs in the art that have not yet been fully solved by currently available exhaust gas after-treatment systems. Accordingly, the subject matter of the present application has been developed to provide apparatus, systems, and methods for reducing $NO_x$ emissions using ammonia storage on an SCR catalyst that overcomes at least some shortcomings of the prior art exhaust gas after-treatment systems.

According to one embodiment, an apparatus for controlling an SCR system of an internal combustion engine system includes an ammonia storage module and a reductant dosing module. The ammonia storage module determines an ammonia storage surface coverage on an SCR catalyst of the SCR system and ammonia compensation value based on one of an excess ammonia flow rate entering the SCR catalyst and an excess $NO_x$ flow rate entering the SCR catalyst. The reductant dosing module that generates a reductant dosing command based on the ammonia compensation value. In some implementations, the ammonia storage module utilizes a feedforward model exclusively for determining the current ammonia surface coverage and the ammonia compensation value.

In certain implementations of the apparatus, the ammonia storage module includes a mode determination module that determines the operating mode of the SCR system as one of an ammonia adsorption mode, an ammonia desorption mode, and a neutral mode based on a pre-calibrated zero ammonia slip threshold. The mode determination module determines the SCR system is operating in the ammonia adsorption mode when an ammonia/$NO_x$ ratio of exhaust gas entering the SCR catalyst is greater than the pre-calibrated zero ammonia slip threshold, the ammonia desorption mode when the ammonia/$NO_x$ ratio is less than the pre-calibrated zero ammonia slip threshold, and the neutral mode when the ammonia/$NO_x$ ratio is equal to the pre-calibrated zero ammonia slip threshold.

The ammonia storage module can also include an excess ammonia flow rate module that determines the excess ammonia flow rate when the mode determination module determines the SCR system is operating in the adsorption mode. Further, when the mode determination module determines the SCR system is operating in the adsorption mode, the ammonia compensation value is based at least partially (e.g., indirectly) on the excess ammonia flow rate. The ammonia storage module can further include an ammonia adsorption mode module that estimates an ammonia storage surface coverage of the SCR catalyst based on the excess ammonia flow rate and a current temperature of the SCR catalyst. In certain implementations, the ammonia adsorption mode module includes stored system dynamic adsorption time constant values relative to excess ammonia flow rates and SCR catalyst temperatures. The ammonia adsorption mode module can estimate a rate of change of the ammonia storage surface coverage by comparing the excess ammonia flow rate and a current temperature of the SCR catalyst to the stored system dynamic time constant values. The ammonia storage surface coverage is based on a mathematical integration of the estimated rate of change of the ammonia storage surface coverage. In certain implementations, the stored ammonia storage surface coverage values for SCR catalyst temperatures above high temperature threshold are approximately zero percent such that the estimated ammonia storage surface coverage is automatically reset following high exhaust temperature events.

In certain implementations of the apparatus, the ammonia storage module includes an excess $NO_x$ flow rate module that determines the excess $NO_x$ flow rate when the mode determination module determines the SCR system is operating in the desorption mode. Furthermore, when the mode determination module determines the SCR system is operating in the desorption mode, the ammonia compensation value is at least partially based on the excess $NO_x$ flow rate. The ammonia storage module can further include an ammonia desorption mode module that estimates an ammonia storage surface coverage of the SCR catalyst based on the excess $NO_x$ flow rate and a current temperature of the SCR catalyst. In some implementations, the ammonia desorption mode module includes stored system dynamic desorption time constant values relative to excess $NO_x$ flow rates and SCR catalyst temperatures. The ammonia desorption mode module estimates a rate of change of the ammonia storage surface coverage by comparing the excess $NO_x$ flow rate and a current temperature of the SCR catalyst to the stored system dynamic time constant values. The ammonia storage surface coverage is based on a mathematical integration of the estimated rate of change of the ammonia storage surface coverage According to some implementations of the apparatus, the ammonia storage module further includes an ammonia storage control module that determines the ammonia compensation value based on the ammonia storage surface coverage estimated by the ammonia adsorption or desorption mode modules 340, 345, and a predetermined ammonia storage surface coverage threshold or target. The ammonia compensation value is negative if the estimated ammonia storage surface coverage is greater than the predetermined ammonia storage surface coverage threshold. In contrast, the ammonia compensation value is positive if the estimated ammonia storage surface coverage is less than the predetermined ammonia storage surface coverage threshold.

In certain implementations, the ammonia compensation value is an ammonia compensation flow rate. The ammonia compensation flow rate can be based on a difference between the determine ammonia storage surface coverage and a predetermined ammonia storage surface coverage threshold.

According to another embodiment, an SCR system includes a reductant dosing system that doses reductant into an exhaust gas stream. The SCR system also includes an SCR catalyst that receives the exhaust gas stream and is positioned downstream of the reductant dosing system. The SCR catalyst stores thereon ammonia present in the exhaust gas stream. The system also includes a controller that controls a dosing rate of reductant dosed into the exhaust gas stream based on an excess ammonia flow rate in the exhaust gas stream in an ammonia storage adsorption mode and an excess $NO_x$ flow rate in the exhaust gas stream in an ammonia storage desorption mode.

In certain implementations of the system, the controller estimates an ammonia storage surface coverage of the SCR catalyst based on the excess ammonia flow rate in the ammonia storage adsorption mode and the excess $NO_x$ flow rate in the ammonia storage desorption mode. The controller also increases the dosing rate if the estimated ammonia storage surface coverage is less than a predetermined desired ammonia storage surface coverage threshold and decreases the dosing rate if the estimated ammonia storage surface coverage is more than the predetermined desired ammonia storage surface coverage threshold. The desired ammonia storage surface coverage threshold can be dependent on an age of the SCR catalyst.

According to some implementations of the system, the excess ammonia flow rate is based on the difference between an ammonia flow rate in the exhaust gas stream and the product of a $NO_x$ flow rate in the exhaust gas stream and a zero slip ammonia/$NO_x$ ratio. In contrast, the excess $NO_x$ flow rate is based on the difference between a $NO_x$ flow rate in the exhaust gas stream and the product of an ammonia flow rate in the exhaust gas stream and the zero slip ammonia/$NO_x$ ratio.

In another embodiment, a method for controlling an SCR system of an internal combustion engine system includes determining a nominal reductant dosing rate for the SCR system and determining an operating mode of the SCR system as one of an adsorption and desorption mode. If the determined operating mode of the SCR system is the adsorption mode, the method includes estimating an ammonia storage surface coverage of the SCR system based on an excess ammonia flow rate in an exhaust gas stream flowing through the SCR system. If the determined operating mode of the SCR system is the desorption mode, the method includes estimating the ammonia storage surface coverage of the SCR system based on an excess $NO_x$ flow rate in the exhaust gas stream. Further, if the estimated ammonia storage surface coverage is greater than a desired ammonia storage surface coverage threshold, the method includes reducing the determined nominal reductant dosing rate. Contrastingly, if the estimated ammonia storage surface coverage is less than a desired ammonia storage surface coverage threshold, then the method includes increasing the determined nominal reductant dosing rate.

In certain implementations, the determined operating mode of the SCR system is the adsorption mode if an ammonia/$NO_x$ ratio in the exhaust gas stream is greater than a pre-calibrated zero slip ammonia/$NO_x$ ratio for a given SCR catalyst temperature, and the desorption mode if the ammonia/$NO_x$ ratio in the exhaust gas stream is less than the pre-calibrated zero slip ammonia/$NO_x$ ratio for the given SCR catalyst temperature. The method can also include automatically resetting the estimated ammonia storage surface area to zero to account for high exhaust temperature events by estimating the ammonia storage surface coverage of the SCR system.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Furthermore, the described features, structures, or characteristics of the subject matter described herein may be combined in any suitable manner in one or more embodiments. In the following description, numerous specific details are provided, such as examples of controls, structures, devices, algorithms, programming, software modules, user selections, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
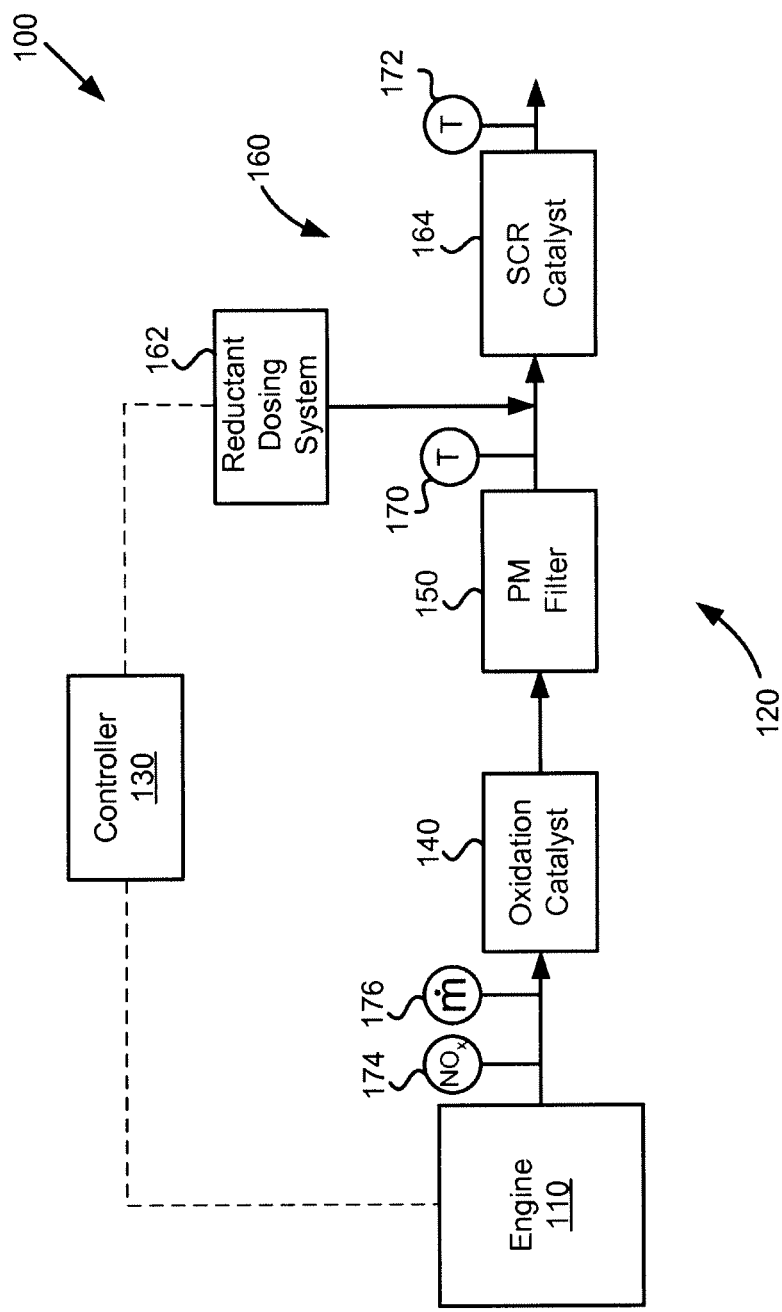
FIG. 1 is a schematic block diagram of an internal combustion engine having an exhaust gas after-treatment system according to one representative embodiment.

FIG. 1 depicts one embodiment of an internal combustion engine system 100. The main components of the engine system 100 include an internal combustion engine 110, an exhaust gas after-treatment system 120 coupled to the engine, and a controller 130 in electrically communicable with the engine and exhaust gas after-treatment system. The internal combustion engine 110 can be a compression ignited internal combustion engine, such as a diesel fueled engine, or a spark-ignited internal combustion engine, such as a gasoline fueled engine operated lean.

Within the internal combustion engine 110, the air from the atmosphere is combined with fuel to power the engine. Combustion of the fuel and air produces exhaust gas. At least a portion of the exhaust gas generated by the internal combustion engine 110 is operatively vented to the exhaust gas after-treatment system 120. In certain implementations, the engine system 100 includes an exhaust gas recirculation (EGR) line (not shown) configured to allow a portion of the exhaust gas generated by the engine to recirculate back into the engine for altering the combustion properties of the engine 110.

Generally, the exhaust gas after-treatment system 120 is configured to remove various chemical compound and particulate emissions present in the exhaust gas received from the engine 110. The exhaust gas after-treatment system 120 includes an oxidation catalyst 140, a particulate matter (PM) filter 150, and an SCR system 160. In an exhaust flow direction, indicated by directional arrows between the exhaust gas after-treatment system components, exhaust may flow from the engine 110, through the oxidation catalyst 140, through the particulate filter 150, through the SCR catalyst system 160, and from the SCR catalyst system into the atmosphere. In other words, in the illustrated embodiment, the PM filter 150 is positioned downstream of the oxidation catalyst 140, and the SCR catalyst system 160 is positioned downstream of the PM filter 140. In other embodiments, the components of the exhaust gas after-treatment system 120 can be positioned in any of various arrangements, and the system can include other components, such as an AMOX catalyst (not shown), or fewer components, such as without a PM filter. Generally, exhaust gas treated in the exhaust gas after-treatment system 120 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 140 can be any of various flow-through oxidation catalysts, such as diesel oxidation catalysts (DOC), known in the art. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, in some implementations, the oxidation catalyst 140 may sufficiently reduce the hydrocarbon and CO concentrations in the exhaust to meet the requisite emissions standards.

The PM filter 150 can be any of various particulate filters known in the art configured to reduce particulate matter concentrations, e.g., soot and ash, in the exhaust gas to meet requisite emission standards. The PM filter 150 can be electrically coupled to a controller, such as the controller 130, that controls various operational characteristics of the PM filter, such as, for example, the timing and duration of filter regeneration events.

The SCR system 160 includes a reductant delivery system 162 and an SCR catalyst 164 downstream of the reductant delivery system. The reductant delivery system 160 is operable to inject or dose a reductant into the exhaust gas prior to the gas entering the SCR catalyst 164 (e.g., at a location between the PM filter 150 and the SCR catalyst 164). Although not shown, in some embodiments, the reductant delivery system 162 includes a reductant source, pump, and delivery mechanism (e.g., a reductant injector or doser). The reductant source can be a container or tank capable of retaining a reductant, such as, for example, ammonia ($NH_3$), urea, diesel fuel, or diesel oil. The reductant source is in reductant supplying communication with the pump, which is configured to pump reductant from the reductant source to the delivery mechanism. The delivery mechanism is selectively controllable to inject reductant directly into the exhaust gas stream prior to entering the SCR catalyst 164.

The injected reductant (or broken-down byproducts of the reductant, such as when urea is reduced to form ammonia) reacts with $NO_x$ in the presence of the SCR catalyst 164 to reduce $NO_x$ in the exhaust gas to less harmful emissions, such as $N_2$ and $H_2O$. The SCR catalyst 164 can be any of various catalysts known in the art. For example, in some implementations, the SCR catalyst 164 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 164 is a zeolite-based catalyst.

The exhaust gas after-treatment system 120 includes various sensors, such as temperature sensors, mass flow sensors, $NO_x$ sensors, and the like that are disposed throughout the exhaust gas after-treatment system in any of various arrangements. For example, in the illustrated embodiment, the exhaust gas after-treatment system 120 includes an exhaust temperature sensor 170 upstream of the SCR catalyst 164 (e.g., between the PM filter 150 and SCR catalyst), an exhaust temperature sensor 172 downstream of the SCR catalyst, an exhaust $NO_x$ concentration sensor 174 upstream of the SCR catalyst (e.g., at an outlet of the engine 110), and an exhaust mass flow sensor 176 positioned upstream of the SCR catalyst (e.g., at the outlet of the engine 110). The various sensors may be in electrical communication with the controller 130 to monitor operating conditions and control the engine system 100, including the engine 110 and exhaust gas after-treatment system 100.

Figure 2:
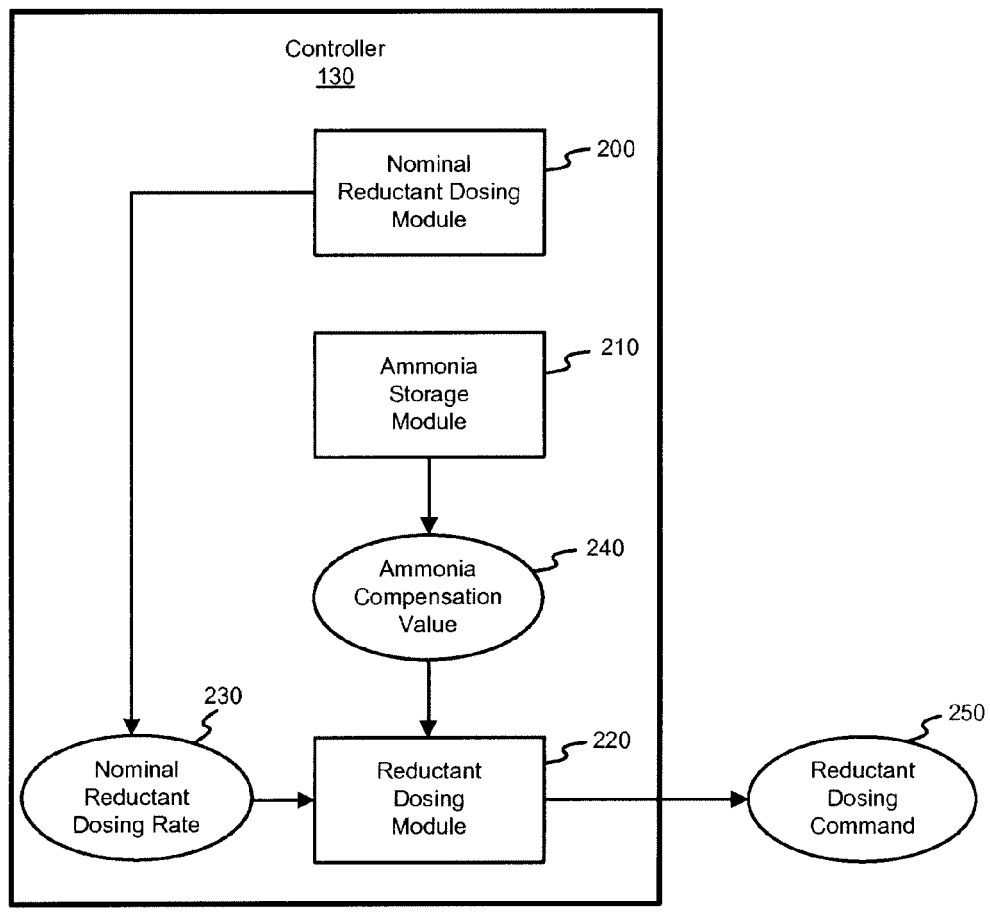
FIG. 2 is a schematic block diagram of a controller of an exhaust gas after-treatment system according to one representative embodiment.

The controller 130 controls the operation of the engine system 100 and associated sub-systems, such as the engine 110 and exhaust gas after-treatment system 120. The controller 130 is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, reduce desired exhaust gas emissions.

The controller 130 includes various modules for controlling the operation of the engine system 100. For example, referring to FIG. 2, and according to one embodiment, the controller 130 includes several modules for controlling operation of the SCR system 160. Generally, in certain embodiments, the controller 130 controls operation of the SCR system 160 to provide efficient and responsive reduction of $NO_x$ during transient and steady state operating conditions, a reduction in the amount of reductant dosed over a given duty cycle, and a reduction of ammonia slip from the tailpipe. The controller 130 includes a nominal reductant dosing module 200, an ammonia storage module 210, and a reductant dosing module 220. Generally, the modules are independently and/or cooperatively operated to achieve optimal $NO_x$ conversion efficiency and speed on the SCR catalyst 164 while minimizing ammonia slip and reductant consumption. The controller 130 is communicable in data receiving and/or transmitting communication with several sub-systems of the engine system 100, such as engine controls and SCR system controls.

The nominal reductant dosing module 200 is operable to determine a nominal reductant dosing rate 230 corresponding with a reductant dosing rate for achieving a desired $NO_x$ reduction efficiency without ammonia storage considerations and without ammonia slip. The desired $NO_x$ reduction efficiency is associated with an amount of $NO_x$ that should be reduced from the exhaust gas stream on the SCR catalyst 164 to achieve a predetermined exhaust gas emissions limit. In certain embodiments, the nominal reductant dosing module 200 determines the nominal reductant dosing rate 230 based on the temperature of the SCR catalyst 164 and the space velocity of the exhaust gas entering the SCR catalyst.

In some embodiments, the nominal reductant dosing module 200 uses any of various methods and models for determining the nominal reductant dosing rate 230. For example, in one embodiment, the nominal reductant dosing module 200 first determines a $NO_x$ reduction requirement associated with the desired $NO_x$ reduction efficiency. The $NO_x$ reduction requirement is based on the amount of $NO_x$ present in the exhaust gas and can be expressed as the fraction of the $NO_x$ in the exhaust gas stream to be reduced. In certain implementations, the amount of $NO_x$ present in the exhaust gas stream can be measured using a $NO_x$ sensor, such as $NO_x$ sensor 174. Alternatively, or additionally, in some implementations, the amount of $NO_x$ present in the exhaust gas stream can be estimated based on the operating conditions of the engine and comparing the conditions against a stored operating map containing predetermined exhaust $NO_x$ levels for various operating conditions.

Generally, the nominal reductant dosing module 200 calculates the reductant dosing rate necessary to achieve the determined $NO_x$ reduction requirement and assign the calculated rate as the nominal reductant dosing rate 230. The nominal reductant dosing rate 230 can be determined using any of various conventional feedforward or feedback methodologies, such as described in U.S. patent application Ser. No. 12/112,678, filed Apr. 30, 2008, which is incorporated herein by reference.

The ammonia storage module 210 of the controller 130 is operable to determine an ammonia compensation value 240 representing an amount of ammonia added to or omitted from the nominal reductant dosing rate 230 to achieve a desirable or desired ammonia storage surface coverage threshold on the SCR catalyst 164. As described in more detail below, the illustrated embodiments utilize a feedforward model for determining the ammonia compensation value 240. For example, the controller 130 does not require the results from a $NO_x$ sensor at the outlet of the SCR to control the SCR system 160. As used herein, ammonia storage surface coverage is defined as the amount of surface area of the bed of the SCR catalyst 164 covered by stored ammonia. In certain embodiments, the ammonia storage surface coverage is expressed as a percentage of the maximum ammonia storage capacity of the SCR catalyst 164.

As discussed above, ammonia stored on the surface of the SCR catalyst can be utilized to compensate for time delays associated with the reductant dosing system 162 and the fast transient nature of the engine 110. For example, if the operational conditions of the engine 110 change such that the amount of $NO_x$ in the exhaust gas drops rapidly resulting in excess ammonia in the exhaust gas, the excess exhaust ammonia can be stored on the surface of the SCR catalyst 164 rather than slip from the system. In contrast, if the operational conditions of the engine 110 change such that the amount of $NO_x$ in the exhaust gas increases rapidly resulting in excess $NO_x$ in the exhaust gas, the ammonia stored on the surface of the SCR catalyst can be used to reduce the excess $NO_x$. Accordingly, the desired ammonia storage surface coverage threshold on the SCR catalyst 164 generally is more than 0% and less than 100% of the maximum ammonia storage capacity of the SCR catalyst. In certain implementations, the desired ammonia storage surface coverage threshold is between approximately 20% and 60% of the maximum ammonia storage capacity of the SCR catalyst 164. For certain applications, target ammonia storage surface coverage thresholds within this range provide an optimal combination of maximum $NO_x$ conversion efficiency and minimal $NH_3$ slip.

The desired ammonia storage surface coverage threshold is determined based on any of various factors, such as the temperature of the exhaust gas, age of the SCR catalyst, temperature of the SCR catalyst bed, exhaust mass flow rate, and type of engine (e.g., duty cycle of engine). In one exemplary implementation, the target ammonia surface coverage is programmed in the controller 130 as a function of SCR catalyst bed temperature and exhaust mass flow rate.

Based on the nominal reductant dosing rate 230 and ammonia compensation value 240, the reductant dosing module 220 generates a reductant dosing command 250 representing the combined nominal reductant dosing rate and ammonia compensation value. The reductant dosing command 250 is electrically communicated to the reductant dosing system 162, which injects reductant into the exhaust gas stream at a rate corresponding with the reductant dosing command. In certain conditions, the ammonia compensation value 240 is a negative value such that the reductant dosing command 250 corresponds to a reductant dosing rate that is less than the nominal reductant dosing rate 230. In contrast, in other conditions, the ammonia compensation value 240 is a positive value such that the reductant dosing command 250 corresponds to a reductant dosing rate that is more than the nominal reductant dosing rate 230. Alternatively, in some conditions, the ammonia compensation value 240 is approximately zero such that the reductant dosing command 250 corresponds to a reductant dosing rate that is the same as the nominal reductant dosing rate 230.

Figure 3:
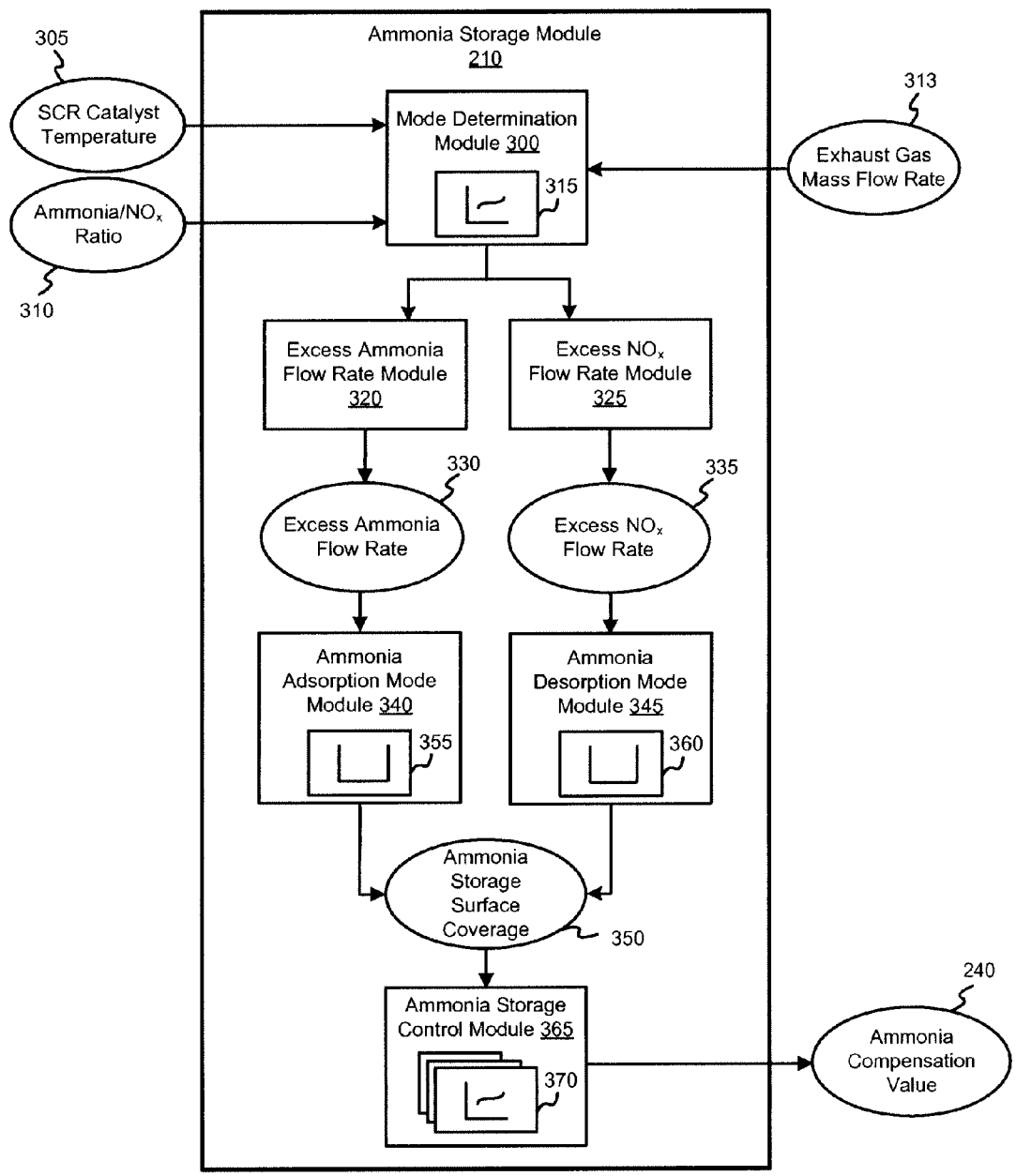
FIG. 3 is a schematic block diagram of an ammonia storage module of an exhaust gas after-treatment system according to one representative embodiment.

Referring to FIG. 3, the ammonia storage module 210 includes a mode determination module 300 operable to determine whether the SCR system 160 is operating in an ammonia storage adsorption mode, an ammonia storage desorption mode, or a neutral mode. Generally, the mode determination module 300 determines the SCR system 160 is operating in the ammonia storage adsorption mode when the mode determination module determines the ammonia storage surface coverage is increasing over time, the ammonia storage desorption mode when the mode determination module determines the ammonia storage surface coverage is decreasing over time, and the neutral mode when the mode determination module determines the ammonia storage surface coverage is not changing over time. The ammonia storage module 210 receives as inputs an SCR catalyst temperature 305, an ammonia/$NO_x$ ratio 310, and an exhaust mass flow rate 313. The SCR catalyst temperature 305 is the measured or estimated temperature of the bed of the SCR catalyst 164. In one implementation, the SCR catalyst temperature 305 is measured using an SCR catalyst bed temperature sensor. In another implementation, the SCR catalyst temperature 305 is estimated using any of various catalyst bed temperature estimation methods known in the art, such as utilizing the exhaust temperature difference measured between temperature sensors 170 and 172.

The ammonia/$NO_x$ ratio 310 represents the ammonia/$NO_x$ ratio in the exhaust gas stream at the inlet of the SCR catalyst 164. Generally, the ammonia/$NO_x$ ratio 310 is determined based on a comparison between a measured or estimated value of the amount of $NO_x$ and the amount of ammonia present in the exhaust gas stream upstream of the SCR catalyst 164. In certain implementations, the amount of $NO_x$ in the exhaust gas stream is estimated using engine calibration tables. In other implementations, the amount of $NO_x$ in the exhaust gas is measured using one or more $NO_x$ sensors, such as $NO_x$ sensor 174. In certain implementations, the amount of ammonia in the exhaust gas stream is based on the amount of ammonia injected into the exhaust gas stream by the reductant dosing system 162 and/or the amount of ammonia measured in the exhaust gas stream by one or more ammonia concentration sensors (not shown).

Figure 4:
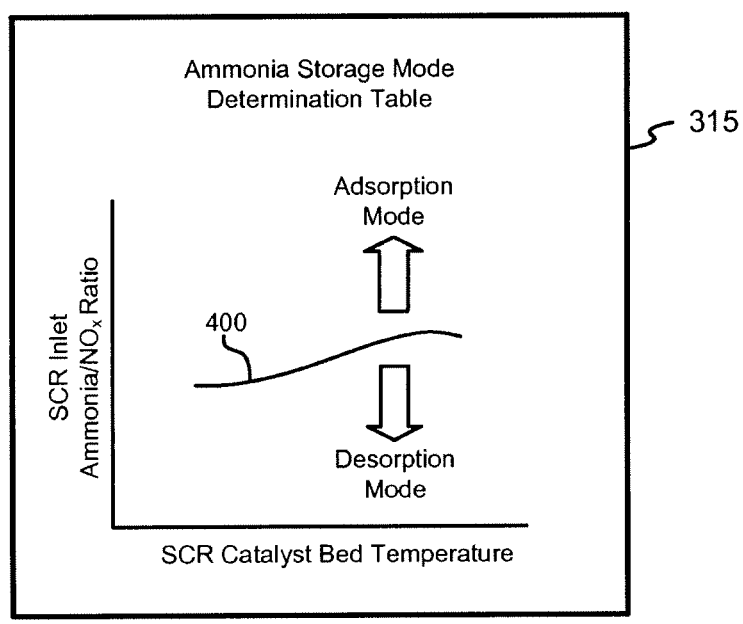
FIG. 4 is an ammonia storage mode determination table of a mode determination module according to one representative embodiment.

The SCR catalyst temperature 305 and ammonia/$NO_x$ ratio 310 are compared against a predetermined ammonia storage mode determination table 315 stored on the mode determination module 300 to determine which of the adsorption and desorption modes, if any, under which the SCR system 160 is operating. Referring to FIG. 4, the ammonia storage mode determination table 315 includes a pre-calibrated zero slip threshold 400 representing the ammonia/$NO_x$ ratio in the exhaust gas at which no ammonia is being adsorbed (i.e., stored) or desorbed (i.e., depleted). In other words, the zero slip threshold 400 represents the ammonia/$NO_x$ ratio resulting in the $NO_x$ reduction requirement being achieved by just the ammonia in the exhaust gas stream without ammonia storage and without ammonia slip. As defined herein, the SCR system 160 is operating in a neutral mode when the ammonia/$NO_x$ ratio is equal to the zero slip threshold.

At a given SCR catalyst temperature, exhaust gas with an ammonia/$NO_x$ ratio above (i.e., greater than) the zero slip threshold 400 indicates that excess ammonia is present in the exhaust gas, a part of which will be stored on the SCR catalyst 164. Accordingly, for ammonia/$NO_x$ ratios above the zero slip threshold 400, the SCR system 160 is operating in an ammonia adsorption mode. In contrast, at a given SCR catalyst temperature, exhaust gas with an ammonia/$NO_x$ ratio below (i.e., less than) the zero slip threshold 400 indicates a shortage of ammonia is present in the exhaust gas, which results in stored ammonia being used for $NO_x$ reduction. Therefore, for ammonia/$NO_x$ ratios below the zero slip threshold 400, the SCR system 160 is operating in an ammonia desorption mode.

The ammonia storage module 210 also includes an excess ammonia flow rate module 320 and excess $NO_x$ flow rate module 325. The excess ammonia flow rate module 320 is operable to determine an excess ammonia flow rate 330 representing the flow rate of excess ammonia in the exhaust stream at a location upstream of the SCR catalyst 164. Similarly, the excess $NO_x$ flow rate module 325 is operable to determine an excess $NO_x$ flow rate 335 representing the flow rate of excess ammonia in the exhaust stream at a location upstream of the SCR catalyst 164. Generally, the excess ammonia flow rate module 320 determines the excess ammonia flow rate 330 by multiplying the measured or estimated exhaust flow rate by the difference between the estimated or measured amount of ammonia in the exhaust stream and the product of the estimated or measured amount of $NO_x$ in the exhaust stream and the zero slip ammonia/$NO_x$ ratio (i.e., $NH_{3(excess\ flow\ rate)} = Exhaust_{(flow\ rate)}[NH_3 - (NO_x * ANR_{zero\ slip})]$). Likewise, the excess $NO_x$ flow rate module 325 determines the excess $NO_x$ flow rate 335 by multiplying the measured or estimated exhaust flow rate by the difference between the estimated or measured amount of $NO_x$ in the exhaust stream and the product of the estimated or measured amount of ammonia in the exhaust stream and the zero slip ammonia/NOx ratio (i.e., $NO_{x(excess\ flow\ rate)} = Exhaust_{(flow\ rate)}[NO_x - (NH_3 * ANR_{zero\ slip})]$).

The excess ammonia and $NO_x$ flow rate modules 320, 325 and selectively operable based on whether the SCR system 160 is operating in the adsorption or desorption modes, respectively, as determined by the mode determination module 300. For example, if the mode determination module 300 determines the SCR system 160 is operating in the ammonia adsorption mode, then the excess ammonia flow rate module 320 is activated to determine the excess ammonia flow rate 330 while the excess $NO_x$ flow rate module 325 is inactive. Alternatively, if the mode determination module 300 determines the SCR system 160 is operating in the ammonia desorption mode, then the excess $NO_x$ flow rate module 325 is activated to determine the excess $NO_x$ flow rate 335 while the excess ammonia flow rate module 320 is inactive.

Referring again to FIG. 3, the ammonia storage module 210 includes an adsorption mode module 340 and a desorption mode module 345. When activated, each ammonia adsorption and desorption mode module 340, 345 is operable to determine an ammonia storage surface coverage 350 of the SCR catalyst 164. The ammonia adsorption mode module 340 is activated when the SCR system 160 is operating in the adsorption mode as discussed above and the ammonia desorption mode module 345 mode module 345 is activated when the SCR system is operating in the desorption mode as discussed above. The ammonia adsorption and desorption mode modules 340, 345 include respective predetermined adsorption and desorption mode ammonia storage tables 355, 360 stored thereon.

Generally, the ammonia storage surface coverage 350 is determined by comparing the excess ammonia and $NO_x$ flow rates 330, 335 and current SCR catalyst bed temperature against the predetermined adsorption and desorption mode ammonia storage tables 355, 360, respectively, to determine respective adsorption and desorption time constant values associated with the ammonia storage surface condition of the SCR catalyst. In certain implementations, each adsorption time constant value in the table 355 represents the time required for the SCR catalyst 164 (starting from zero ammonia storage surface coverage) to reach a maximum ammonia storage surface coverage at the excess ammonia flow rate and SCR catalyst bed temperature associated with each adsorption time constant value. Similarly, each desorption time constant value in the table 360 represents the time required for the SCR catalyst 164 (starting from a maximum ammonia storage surface coverage) to reach zero ammonia storage surface coverage at the excess $NO_x$ flow rate and SCR catalyst bed temperature associated with each desorption time constant value.

Figure 5:
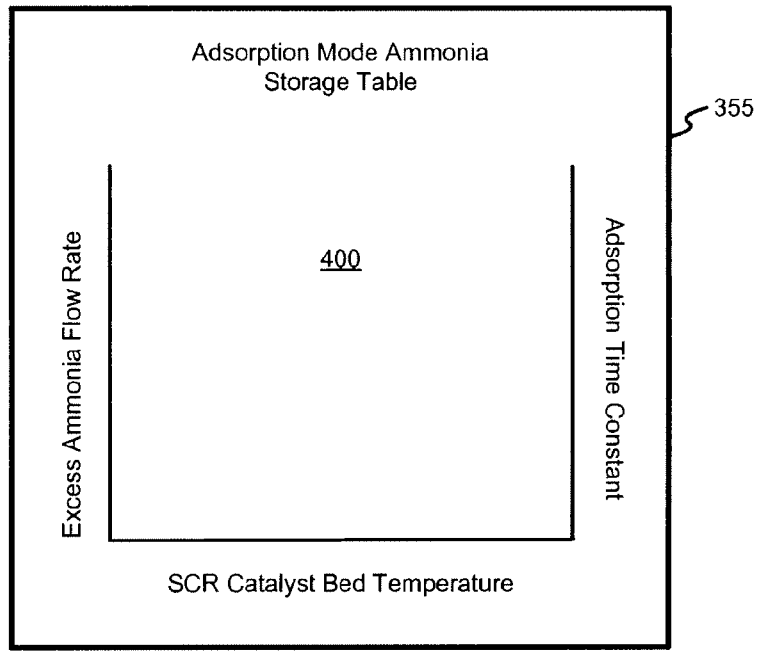
FIG. 5 is an adsorption mode ammonia storage table of an ammonia adsorption mode module according to one representative embodiment.

In one embodiment shown in FIG. 5, the adsorption mode ammonia storage table 355 includes predetermined ammonia storage surface data 400 (e.g., time constants) plotted against excess ammonia flow rate values and SCR catalyst temperature values. In one specific embodiment, as an example only, the adsorption mode ammonia storage table 355 includes the following pre-determined adsorption time constants for the associated excess ammonia flow rates (g/hr) and an SCR catalyst bed temperature of 150° C.: 15,000 (0.5 g/hr), 9564.8 (5 g/hr), 2391.2 (20 g/hr), 797.1 (60 g/hr), 191.3 (250 g/hr), and 47.8 (1,000 g/hr). As another example, the table 355 can include the following pre-determined adsorption time constants for the associated excess ammonia flow rates (g/hr) and an SCR catalyst bed temperature of 400° C.: 15,000 (0.5 g/hr), 29.3 (5 g/hr), 7.3 (20 g/hr), 2.4 (60 g/hr), 0.6 (250 g/hr), and 0.1 (1,000 g/hr).

When activated, the ammonia adsorption mode module 340 receives the excess ammonia flow rate 330 from the excess ammonia flow rate module 320, along with the current temperature of the SCR catalyst 164. Using the table 355, the ammonia adsorption mode module 340 determines the predetermined ammonia storage surface time constant corresponding with the received excess ammonia flow rate 330 and current SCR catalyst bed temperature.

Each time constant is a predetermined value that captures the fundamental response time of the SCR catalyst to a perturbation (e.g., excess $NO_x$ or excess $NH_3$) upstream of the SCR catalyst by treating the system as a first order dynamic system. Moreover, each time constant corresponds directly with a predetermined rate of increase of the ammonia storage surface coverage. Accordingly, the ammonia adsorption mode module 340 determines the rate of increase of the ammonia storage surface coverage that corresponds with the determined time constant. The determined time constant is used to calculate an ammonia storage surface coverage on the SCR catalyst 164 according to the following formula: $ASSC_t = ASSC_{t-1} + [ASSC_{ROC} * \Delta t]$, where $ASSC_t$ is the ammonia storage surface coverage at time t, $ASSC_{t-1}$ is a previously determined ammonia storage surface coverage at some time t−1 before time t, $ASSC_{ROC}$ is the rate of change of the ammonia storage surface, and $\Delta t$ is the difference between time t and time t−1. The ammonia storage surface coverage value calculated using the above formula is then set by the ammonia adsorption mode module 340 as the current ammonia storage surface coverage 350.

Figure 6:
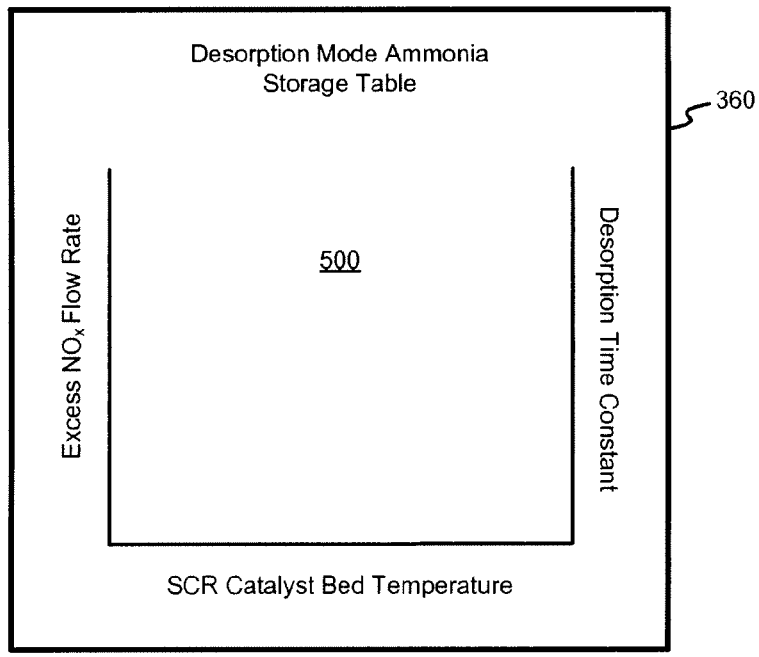
FIG. 6 is a desorption mode ammonia storage table of an ammonia desorption mode module according to one representative embodiment.

As shown in FIG. 6, the desorption mode ammonia storage table 360 is used by the ammonia desorption mode module 345 in a manner similar to the adsorption mode ammonia storage table 355 to determine the current ammonia storage surface coverage except instead of counting up, it counts down the ammonia surface coverage on the SCR by comparing the excess $NO_x$ flow rate 335 against the data. More specifically, the ammonia desorption mode module 345 uses the same formula used by the ammonia desorption mode module 345 except the $ASSC_{ROC}$ determined from the time constant taken from the table 360 is a rate of decrease, while the $ASSC_{ROC}$ determined from the time constant taken from the table 355 is a rate of increase. In one specific embodiment, as an example only, the desorption mode ammonia storage table 360 includes the following pre-determined desorption time constants for the associated excess $NO_x$ flow rates (g/hr) and an SCR catalyst bed temperature of 170° C.: 10,216 (25 g/hr), 3405.3 (75 g/hr), 1702.7 (150 g/hr), 851.3 (300 g/hr), 425.7 (600 g/hr), and 212.8 (1,200 g/hr). As another example, the table 360 can include the following pre-determined desorption time constants for the associated excess $NO_x$ flow rates (g/hr) and an SCR catalyst bed temperature of 400° C.: 316.9 (25 g/hr), 105.6 (75 g/hr), 52.8 (150 g/hr), 26.4 (300 g/hr), 13.2 (600 g/hr), and 6.6 (1,200 g/hr).

The configuration and operation of the ammonia adsorption and desorption mode modules 340, 345 provide an accurate estimate of ammonia storage surface coverage on the SCR catalyst 164 without requiring feedback from sensors placed downstream of the SCR catalyst. Moreover, because dynamic time constants of the SCR system 160 used to determine ammonia storage surface coverage are independent of downstream conditions, the presence or absence of an AMOX catalyst downstream of the SCR catalyst 164 does not affect the accuracy and efficacy of the modules 340, 345.

SCR catalyst dynamics increase rapidly with temperature. The predetermined catalyst dynamics time constants account for this physical relationship by being significantly small values (e.g., on the order of a second or less). Because of the relatively small values for the catalyst dynamics time constants, the ammonia adsorption and desorption mode modules 340, 345 automatically reset the estimated amount of ammonia stored on the SCR catalyst 164 to zero following high exhaust temperature events. Generally, high exhaust temperature events caused by operation of the engine 110 or exhaust after-treatment system 120 (e.g., PM filter regeneration) causes most, if not all, of the ammonia stored on the SCR catalyst 164 to be desorbed or removed from the SCR catalyst. For proper operation of the SCR system 160, the complete release of ammonia from the SCR catalyst 164 due to a high exhaust temperature event must be taken into account by effectively resetting the ammonia storage surface coverage to zero or 0%.

In conventional SCR systems, the ammonia storage surface coverage of the SCR catalyst set independently of the ammonia storage surface coverage calculation. In other words, for conventional SCR systems, regardless of the estimated amount of ammonia stored on the SCR catalyst, if a high temperature event is detected, the amount of ammonia stored on the SCR catalyst for purposes of controlling the system operation is set to zero according to logic independent of the ammonia storage surface coverage estimation logic.

In contrast to conventional systems, the resetting of the ammonia storage surface coverage due to a high temperature event is built into the logic for estimating the ammonia storage surface coverage. More specifically, as discussed above, because of the unique method of comparing the excess ammonia and NO flow rates to SCR catalyst temperature to estimate the ammonia storage surface coverage, the predetermined ammonia storage surface coverage data 400, 500 accounts for extreme exhaust temperature events. In other words, the ammonia storage surface coverage value at extreme high exhaust temperatures taken from the tables 355, 360 is at or near zero. In this manner, an automatic SCR catalyst reset function is incorporated into the estimation of the ammonia storage surface coverage for extreme temperature events.

Figure 7:
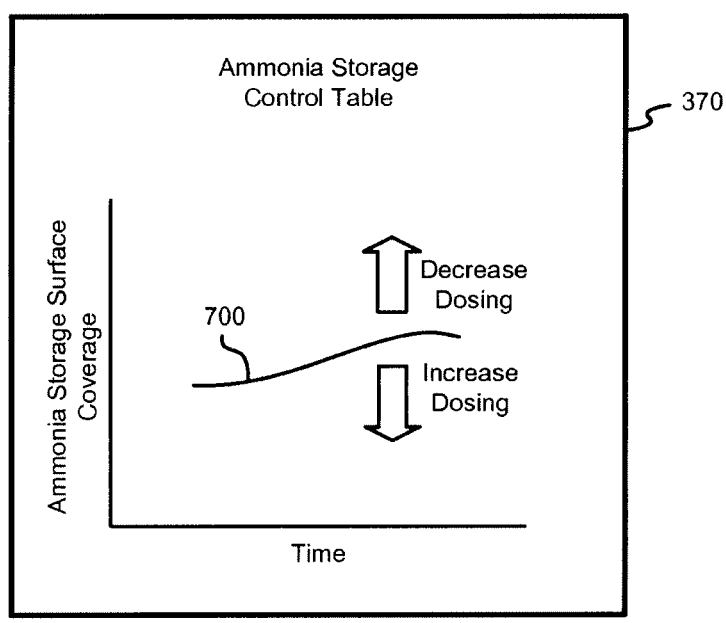
FIG. 7 is a schematic block diagram of an ammonia storage control table of an ammonia storage control module according to one representative embodiment.

The ammonia storage module 210 additionally includes an ammonia storage control module 365. As shown, the ammonia storage module 210 determines the ammonia compensation value 240 based on the ammonia storage surface coverage 350 (and the SCR catalyst temperature used to determine the ammonia storage surface coverage) received from a respective one of the ammonia adsorption and desorption mode modules 340, 345. The ammonia compensation value 240 is determined by comparing the current ammonia storage surface coverage 350 and the operating time of the SCR catalyst 164 against at least one of a plurality of predetermined ammonia storage control tables 370 stored on the ammonia storage control module 365. As represented in FIG. 7, each table 370 includes a pre-calibrated desired ammonia storage surface coverage threshold 700 at a specific and different SCR catalyst temperature. In certain implementations, the desired ammonia storage surface coverage threshold 700 is lower for higher SCR catalyst temperatures, and higher for lower SCR catalyst temperatures. This allows the SCR system 160 to more effectively reduce $NO_x$ emissions in low temperature duty cycles by virtue of storing a high amount of ammonia on the SCR catalyst.

The ammonia storage control module 365 selects an ammonia storage control table 370 of the plurality of tables 370 corresponding with the SCR catalyst temperature used to determine the time constants from table 355 and/or table 36, which are used to estimate the current ammonia storage surface coverage 350. The ammonia storage surface coverage 350 and elapsed operating time of the SCR catalyst 164 are compared against the target ammonia storage surface coverage threshold 700 of the selected table 370. In some instances, there may not be a table 370 having the SCR catalyst temperature. For example, the SCR catalyst temperature may be more than an SCR catalyst temperature associated with one table 370, but less than the next closest SCR catalyst temperature for which a table is available. Accordingly, for SCR catalyst temperatures falling between two SCR catalyst temperatures for which tables are available, the ammonia storage control module 365 may be configured to determine the ammonia storage surface coverage using the data provided by the two tables and common interpolation techniques.

Ammonia storage surface coverage values above (i.e., greater than) the desired ammonia storage surface coverage threshold 700 indicate that a larger than desired portion of the surface of the SCR catalyst is covered by stored ammonia. Accordingly, if the ammonia storage surface coverage 350 is above the desired ammonia storage surface coverage threshold 700, then the dosing rate of reductant should be reduced to facilitate desorption of the excess ammonia stored on the SCR catalyst 164 and a reduction of the ammonia storage surface coverage. Generally, the ammonia storage control module 365 reduces the reductant dosing rate until the ammonia storage surface coverage meets the desired ammonia storage surface coverage threshold 700.

In contrast, ammonia storage surface coverage values below (i.e., less than) the desired ammonia storage surface coverage threshold 700 indicate that a smaller than desired portion of the surface of the SCR catalyst is covered by stored ammonia. Accordingly, if the ammonia storage surface coverage 350 is below the desired ammonia storage surface coverage threshold 700, then the dosing rate of reductant should be increased to facilitate adsorption of excess ammonia in the exhaust gas on the SCR catalyst 164 and an increase of the ammonia storage surface coverage. Generally, the ammonia storage control module 365 increases the reductant dosing rate until the ammonia storage surface coverage meets the desired ammonia storage surface coverage threshold 700.

The ammonia storage control module 365 generates the ammonia compensation value 240 based on whether reductant dosing should be increased or decreased. As discussed above, the ammonia compensation value 240 represents an amount of ammonia added to or subtracted from the nominal reductant dosing rate 230 to achieve the desired ammonia storage surface coverage threshold 700. Accordingly, in certain implementations, the ammonia compensation value 240 is expressed as a positive reductant dosing rate if ammonia should be added, a negative reductant dosing rate if ammonia should be subtracted, and a zero amount if ammonia does not need to be added or subtracted (e.g., if the ammonia storage surface coverage 350 is equal to the desired ammonia storage surface coverage threshold 700).

The rate (e.g., speed and efficiency) at which the ammonia storage surface coverage approaches the desired ammonia storage surface coverage threshold 700 can be regulated by the ammonia storage control module 365. For example, in certain applications, it may be desirable to meet the desired ammonia storage surface coverage threshold 700 as rapidly as possible, such as in applications involving highly transient operating conditions. Alternatively, in applications involving consistent steady-state operating conditions, the desired ammonia storage surface coverage threshold 700 need not be met at quickly. Accordingly, the ammonia storage control module 365 also is operable to determine an appropriate magnitude of the ammonia compensation value 240 for approaching the desired ammonia storage surface coverage threshold 700 at a desirable rate. In certain implementations, the magnitude of the ammonia compensation value is based on at least one of exhaust flow rate, SCR catalyst temperature, predicted future operating conditions of the engine 110, and the time constants obtained from the adsorption and desorption mode ammonia storage tables 355, 360 as discussed above.

Based on the determined magnitude of the ammonia compensation value, a dosing rate (e.g., dosing rate compensation) is selected that prevents an excessive increase in ammonia, which can lead to ammonia slip or area deposit formation, and prevents an excessive decrease, which can lead to lower-than-desired $NO_x$ conversion efficiencies. Despite the ability to regulate the rate at which the ammonia storage surface coverage approaches the desired ammonia storage surface coverage threshold 700 in some embodiments, in other embodiments, the ammonia storage control module 365 preferably selects the magnitude of the ammonia compensation value 240 to approach the desired ammonia storage surface coverage threshold 700 as quickly as possible without overshooting the target.

In certain implementations, the dosing rate compensation, which corresponds with the ammonia compensation value 240, is directly proportional to the difference between the current storage surface coverage and the desired ammonia storage surface coverage (e.g., the desired ammonia storage surface coverage threshold 700). Therefore, the dosing rate compensation corresponding with the ammonia compensation value 240 is automatically reduced to zero when the desired ammonia storage surface coverage threshold 700 has been reached. In one implementation, the ammonia compensation value 240 as a measure of flow rate is calculated accorded to the formula: $ACFR = \Delta ASSC * ASSC_{MAX} * MWA / [\tau * V]$, where ACFR is the ammonia compensation flow rate, $\Delta ASSC$ is the difference between the current ammonia storage surface coverage 350 and the desired ammonia storage surface coverage threshold 700, $ASSC_{MAX}$ is the maximum ammonia storage surface coverage of the SCR catalyst, MWA represents the molecular weight adjustments, $\tau$ is the time constant determines from the tables 355, 360, and V is the SCR catalyst volume. Once the desired ammonia storage surface coverage threshold 700 is reached, the ammonia compensation flow rate is set to zero and reductant is dosed at the nominal reductant dosing rate 230. In this manner, the maximum NOx conversion efficiency of the SCR system 160 is achieved based on the current ammonia storage surface coverage 350 and the quantity of reductant injected into the exhaust gas is reduced, which results in a cost savings.

As discussed above, the reductant dosing module 220 of the controller 130 receives the ammonia compensation value 240 from the ammonia storage control module 365 and combines it with the nominal reductant dosing rate 230 to generate the reductant dosing command 250.

Figure 8:
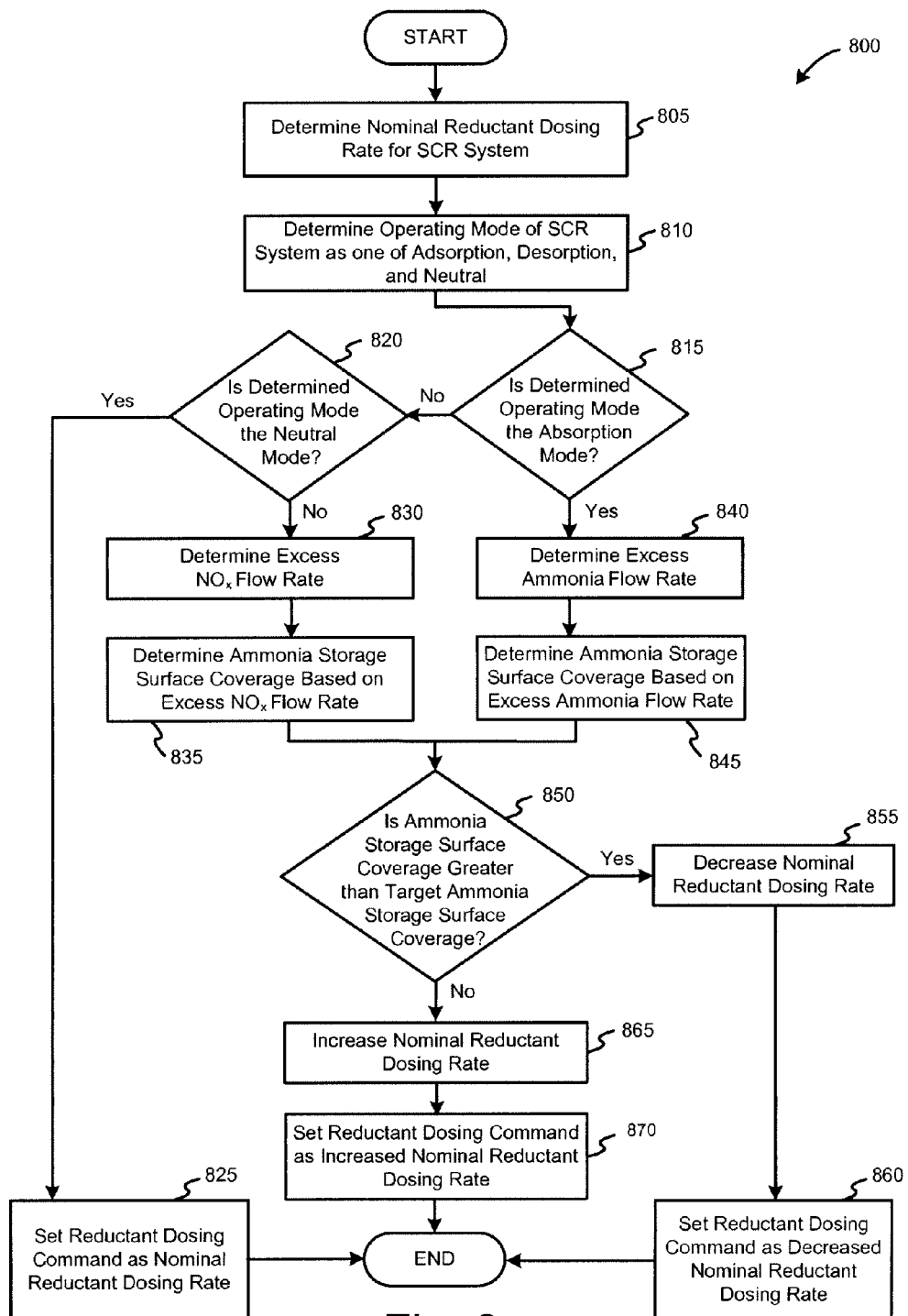
FIG. 8 is a schematic flow chart diagram of a method for estimating and controlling ammonia surface coverage on an SCR catalyst according to one representative embodiment.

According to one embodiment shown in FIG. 8, a method 800 for estimating and controlling ammonia surface coverage on an SCR catalyst includes determining a nominal reductant dosing rate for an SCR system at 805. The nominal reductant dosing rate can be determined by operation of the nominal reductant dosing module 200, and/or using any of various methods known in the art. The method 800 also includes determining the operating mode of the SCR system as one of an adsorption, a desorption, and a neutral mode at 810. In certain implementations, the mode determination module 300 of the ammonia storage module 210 determines the operating mode of the SCR system.

If decided at 815 that the SCR system is not operating in the adsorption mode, the method 800 proceeds to decide if the SCR system is operating in the neutral mode at 820. If the decision at 820 is positive, then a reductant dosing command intended for transmission to a reductant dosing system is set to the nominal reductant dosing rate at 825. However, if the decision at 820 is negative (i.e., the SCR system is operating in the desorption mode), then the method determines an excess $NO_x$ flow rate at 830. In certain implementations, the excess $NO_x$ flow rate can be determined by the excess $NO_x$ flow rate module 325. The excess $NO_x$ flow rate determined at 830 is used to determine an ammonia storage surface coverage at 835. In certain implementations, the ammonia desorption mode module 345 is operated to determine the ammonia storage surface coverage at 835.

Referring back in the method 800, if the decision at 815 is positive, an excess ammonia flow rate is determined at 840. In certain implementations, the excess ammonia flow rate can be determined by the excess ammonia flow rate module 320. The excess ammonia flow rate determined at 840 is used to determine an ammonia storage surface coverage at 845. In certain implementations, the ammonia adsorption mode module 340 is operated to determine the ammonia storage surface coverage at 845. It is decided at 850 whether the ammonia storage surface coverage determined at 835, or alternatively at 845, is greater than a desired ammonia storage surface coverage threshold. If the decision at 850 is answered positively, then the nominal reductant dosing rate is decreased at 855 and the reductant dosing command is set to the decreased nominal reductant dosing rate at 860. However, if the decision at 850 is answered negatively, then the nominal reductant dosing rate is increased at 865 and the reductant dosing command is set to the increased nominal reductant dosing rate at 870.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A controller for controlling a selective catalytic reduction (SCR) system of an internal combustion engine system comprising:
   a reductant dosing module configured to generate a reductant command based, at least in part, on a determined ammonia compensation value and output the generated reductant command to a reductant delivery system, the reductant delivery system injecting reductant into an exhaust gas stream at a rate based on the generated reductant command; and
   an ammonia storage module comprising:
   a mode determination module configured to determine an operating mode of the SCR system as one of an adsorption mode, a desorption mode, or a neutral mode;
   an ammonia adsorption mode module or an ammonia desorption mode module configured to receive a first ammonia storage surface coverage value and calculate a second ammonia storage surface coverage value based, at least in part, on the determined operating mode of the SCR system; and
   an ammonia storage control module configured to determine the ammonia compensation value based, at least in part, on the calculated second ammonia storage surface coverage value and output the determined ammonia compensation value to the reductant dosing module.

2. The controller of claim 1, wherein determining the mode determination module is configured to determine the operating mode of the SCR system based, at least in part, on a SCR catalyst temperature and an ammonia-to-$NO_x$ ratio upstream of a SCR catalyst.

3. The controller of claim 2, wherein determining the mode determination module is configured to determine the operating mode of the SCR system as one of the adsorption mode, the desorption mode, or the neutral mode based on comparing the ammonia-to-NOx ratio upstream of the SCR catalyst to a zero slip threshold of an ammonia storage table for the SCR catalyst temperature.

4. The controller of claim 2 wherein the ammonia storage module further comprises:
   an excess ammonia flow rate module configured to determine an excess ammonia flow rate responsive to the mode determination module determining the operating mode of the SCR system is the adsorption mode;
   wherein the ammonia adsorption mode module calculates the second ammonia storage surface coverage value based, at least in part, on the determined excess ammonia flow rate.

5. The controller of claim 4, wherein the ammonia adsorption mode module calculates the second ammonia storage surface coverage value based, at least in part, on a time constant from an adsorption ammonia storage table for the determined excess ammonia flow rate and a SCR catalyst temperature.

6. The controller of claim 5, wherein the time constant corresponds to a predetermined rate of increase of ammonia storage surface coverage of a SCR catalyst.

7. The controller of claim 2 wherein the ammonia storage module further comprises:
   an excess $NO_x$ flow rate module configured to determine an excess $NO_x$ flow rate responsive to the mode determination module determining the operating mode of the SCR system is the desorption mode;

wherein the ammonia desorption mode module calculates the second ammonia storage surface coverage value is based, at least in part, on the determined excess $NO_x$ flow rate.

8. The controller of claim 7, wherein the ammonia desorption mode module calculates the second ammonia storage surface coverage value based, at least in part, on a time constant from a desorption ammonia storage table for the determined excess $NO_x$ flow rate and a SCR catalyst temperature.

9. The controller of claim 8, wherein the time constant corresponds to a predetermined rate of decrease of ammonia storage surface coverage of a SCR catalyst.

10. The controller of claim 2, wherein the ammonia storage module is configured to set the first ammonia storage surface coverage value to zero responsive to a high temperature event.

11. A system comprising:
an SCR system including:
a reductant delivery system, and
an SCR catalyst, and
a controller configured to:
receive a first ammonia storage surface coverage value indicative of an amount of ammonia stored on a surface of the SCR catalyst,
determine an operating mode of the SCR system as one of an adsorption mode, a desorption mode, or a neutral mode,
calculate a second ammonia storage surface coverage value based, at least in part, on the determined operating mode of the SCR system,
determine an ammonia compensation value based, at least in part, on the calculated second ammonia storage surface coverage value,
generate a reductant command based, at least in part, on the determined ammonia compensation value, and
output the generated reductant command to the reductant delivery system.

12. The system of claim 11, wherein determining the operating mode of the SCR system is based, at least in part, on a temperature of the SCR catalyst and an ammonia-to-NOx ratio upstream of the SCR catalyst.

13. The system of claim 12, wherein the ammonia-to-NOx ratio upstream is based, at least in part, on an amount of NOx determined from an engine calibration table.

14. The system of claim 13, wherein the ammonia-to-NOx ratio upstream is based, at least in part, on an amount of NOx received from a NOx sensor upstream of the SCR catalyst.

15. The system of claim 13, wherein the ammonia-to-NOx ratio upstream is based, at least in part, on an amount of ammonia dosed by the reductant delivery system.

16. The system of claim 13, wherein the ammonia-to-NOx ratio upstream is based, at least in part, on an amount of ammonia received from an ammonia sensor upstream of the SCR catalyst.

17. A method comprising:
setting a first ammonia storage surface coverage value to zero responsive to a high temperature event;
determining an operating mode of an SCR system;
calculating a second ammonia storage surface coverage value based, at least in part, on the determined operating mode of the SCR system;
determining an ammonia compensation value based, at least in part, on the calculated second ammonia storage surface coverage value;
generating a reductant command based, at least in part, on the determined ammonia compensation value; and
outputting the generated reductant command to a reductant delivery system, the reductant delivery system injecting reductant into an exhaust gas stream at a rate based on the generated reductant command.

18. The method of claim 17, wherein the determined operating mode of the SCR system is one of an adsorption mode or a desorption mode.

19. A non-transitory computer-readable memory device storing instructions that, when executed by one or more processors, cause the one or more processors to perform operations comprising:
interpreting a first ammonia storage surface coverage value;
determining an operating mode of an SCR system as one of an adsorption mode, a desorption mode, or a neutral mode;
calculating a second ammonia storage surface coverage value based, at least in part, on the determined operating mode of the SCR system;
determining an ammonia compensation value based, at least in part, on the calculated second ammonia storage surface coverage value;
generating a reductant command based, at least in part, on the determined ammonia compensation value; and
outputting the generated reductant command to a reductant delivery system, the reductant delivery system injecting reductant into an exhaust gas stream at a rate based on the generated reductant command.

20. The non-transitory computer-readable memory device of claim 19 storing instructions that cause the one or more processors to perform operations further comprising:
determining an excess ammonia flow rate responsive to determining the operating mode of the SCR system is the adsorption mode;
wherein calculating the second ammonia storage surface coverage value is based, at least in part, on the determined excess ammonia flow rate.

21. The non-transitory computer-readable memory device of claim 20 storing instructions that cause the one or more processors to perform operations further comprising:
determining an excess $NO_x$ flow rate responsive to determining the operating mode of the SCR system is the desorption mode;
wherein calculating the second ammonia storage surface coverage value is based, at least in part, on the determined excess $NO_x$ flow rate.

22. The non-transitory computer-readable memory device of claim 20, wherein determining the ammonia compensation value is based on a desired ammonia storage surface coverage threshold of an ammonia storage control table selected based on the calculated second ammonia storage surface coverage value.

* * * * *